United States Patent
Cournoyer et al.

(10) Patent No.: US 11,594,772 B2
(45) Date of Patent: Feb. 28, 2023

(54) BATTERY MODULE AND METHODS OF ASSEMBLY

(71) Applicant: Rivian IP Holdings, LLC, Plymouth, MI (US)

(72) Inventors: Travis Cournoyer, Redondo Beach, CA (US); Nathaniel Wynn, Tustin, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 228 days.

(21) Appl. No.: 17/064,160

(22) Filed: Oct. 6, 2020

(65) Prior Publication Data
US 2022/0109131 A1  Apr. 7, 2022

(51) Int. Cl.
| | |
|---|---|
| H01M 50/116 | (2021.01) |
| H01M 10/04 | (2006.01) |
| H01M 10/6554 | (2014.01) |
| B32B 37/12 | (2006.01) |

(52) U.S. Cl.
CPC ....... *H01M 50/116* (2021.01); *B32B 37/1284* (2013.01); *H01M 10/0422* (2013.01); *H01M 10/6554* (2015.04); *B32B 2037/1253* (2013.01); *B32B 2310/0831* (2013.01); *B32B 2457/10* (2013.01)

(58) Field of Classification Search
CPC .......... H01M 50/116; H01M 10/6554; H01M 10/0422
See application file for complete search history.

(56) References Cited

U.S. PATENT DOCUMENTS

2019/0267584 A1 *  8/2019  Kwon ................... H01M 50/20

* cited by examiner

*Primary Examiner* — Olatunji A Godo
(74) *Attorney, Agent, or Firm* — Haley Guiliano LLP

(57) ABSTRACT

A battery module and a method of assembling a battery module are provided. The method includes selectively applying a light-cure adhesive to recesses in a first side of a carrier layer and inserting battery cells into respective recesses. The method further includes exposing the first side of the carrier layer to light to at least partially cure the light-cure adhesive with the carrier layer in a first orientation, moving the carrier layer into a second orientation, and exposing a second opposite side of the carrier layer to light to fully cure the light-cure adhesive. The recesses may include a sidewall having crush points spaced apart along the sidewall and a bottom portion having an opening between a pair of crush points, where adhesive is not disposed between the pair of crush points.

20 Claims, 11 Drawing Sheets

BATTERY MODULE AND METHODS OF ASSEMBLY

SUMMARY

It is advantageous to package battery cells closely in high-voltage, large-format battery modules to provide high energy density battery modules. Cylindrical battery cells in a battery module may be positioned with carrier layers at both ends of the battery cells to prevent the battery cells from touching each other and short-circuiting or causing thermal runaway. Because carrier layers add size and thickness to the battery module, it is desirable to use only a single carrier layer at one end of the battery cells. However, the assembly of such a battery module may require additional machinery or manufacturing time to maintain the position of each of the battery cells during the assembly process. Accordingly, it would be advantageous to provide, in accordance with some embodiments of the present disclosure, a method of assembling a battery module having only a single carrier layer without requiring additional machinery or manufacturing time to maintain the position of each of the battery cells during the assembly process.

To solve these problems, a battery module and a method for assembling the battery module are provided. The method includes providing a carrier layer, a plurality of battery cells, and a light-cure adhesive, the carrier layer including a first side and a second side opposite the first side, the first side including a plurality of recesses, each configured to receive an end of one of the plurality of battery cell. The method further includes selectively applying the light-cure adhesive to each of the plurality of recesses in the carrier layer, inserting each of the plurality of battery cells into a respective recess of the plurality of recesses with the carrier layer in a first orientation, a first end of each of the plurality of battery cells thereby making contact with the light-cure adhesive in its respective recess, and exposing the first side of the carrier layer, after inserting each of the plurality of battery cells, to light to at least partially cure the light-cure adhesive with the carrier layer in the first orientation. The method further includes moving the carrier layer, after exposing the first side of the carrier layer to light, into a second orientation, and exposing the second side of the carrier layer to light to fully cure the light-cure adhesive with the carrier layer in the second orientation.

In some embodiments of the present disclosure, the selectively applying the light-cure adhesive to each of the plurality of recesses may include selectively applying the light-cure adhesive to a sidewall of each of the plurality of recesses.

In some embodiments of the present disclosure, the selectively applying the light-cure adhesive to the sidewall of each of the plurality of recesses may include selectively applying a plurality of dollops of light-cure adhesive along the sidewall of each of the plurality of recesses.

In some embodiments of the present disclosure, the selectively applying the light-cure adhesive to each of the plurality of recesses may include selectively applying the light-cure adhesive to the first end of each of the plurality of battery cells before inserting each of the plurality of battery cells into a respective recess of the plurality of recesses.

In some embodiments of the present disclosure, each of the plurality of recesses may include a sidewall. The sidewall may include a plurality of crush points spaced apart from each other along the sidewall and protruding from the sidewall such that the plurality of crush points may be configured to at least partially hold a respective battery cell, of the plurality of battery cells, by interference fit when the battery cell is pressed into its respective recess.

In some embodiments of the present disclosure, the selectively applying the light-cure adhesive to each of the plurality of recesses may include at least one of: selectively applying the light-cure adhesive to portions of the sidewall between all but one of adjacent ones of the plurality of crush points before inserting each of the plurality of battery cells into a respective recess of the plurality of recesses; and selectively applying the light-cure adhesive to portions of the first end of each of the plurality of battery cells before inserting each of the plurality of battery cells into a respective recess of the plurality of recesses, each of the portions of the first end of each of the plurality of battery cells corresponding to portions of the sidewall between all but one of adjacent ones of the plurality of crush points.

In some embodiments of the present disclosure, the method may further include attaching, after exposing the first side of the carrier layer to light, sidewalls to the battery module.

In some embodiments of the present disclosure, the method may further include inserting, after exposing the first side of the carrier layer to light and before attaching the sidewalls to the battery module, a barrier layer between a first group of battery cells and a second group of battery cells among the plurality of battery cells.

In some embodiments of the present disclosure, the barrier layer may electrically isolate sidewalls of the first group of battery cells from sidewalls of the second group of battery cells.

In some embodiments of the present disclosure, the method may further include attaching, after exposing the second side of the carrier layer to light, a current collector assembly to the second side of the carrier layer and electrically coupling portions of the current collector assembly to the plurality of battery cells.

In some embodiments of the present disclosure, the method may further include applying, after exposing the second side of the carrier layer to light, a thermal interface material to one of a cooling surface and a second end of each of the plurality of battery cells.

In some embodiments of the present disclosure, the method may further include attaching the cooling surface to the second end of each of the plurality of battery cells using the thermal interface material.

In some embodiments of the present disclosure, the plurality of battery cells may be positioned in a close-hex-pack configuration in the carrier layer.

In some embodiments of the present disclosure, the carrier layer may include a plastic configured to allow passage of the light through the carrier layer to fully cure the light-cure adhesive when exposing the second side of the carrier layer to the light.

In some embodiments of the present disclosure, the carrier layer in the first orientation may be an orientation in which the first side of the carrier layer is facing up, with respect to gravity.

In some embodiments of the present disclosure, the first orientation may be opposite to the second orientation.

In some embodiments of the present disclosure, the light-cure adhesive may be a UV-cure adhesive, and the light may be a UV light.

In some embodiments of the present disclosure, a battery module is provided. The battery module includes a current collector assembly, a plurality of battery cells, a light-cure adhesive, and a carrier layer including a first side and a second side opposite the first side, the first side including a plurality of recesses. Each of the plurality of recesses includes a sidewall and a bottom portion, the sidewall including a plurality of crush points spaced apart from each other along the sidewall and protruding from the sidewall, and the bottom portion including an opening positioned between a pair of the plurality of crush points. A first end of each of the plurality of battery cells is coupled to a respective recess of the plurality of recesses by the light-cure adhesive disposed between the first end of each of the plurality of battery cells and a first portion of the sidewall. The light-cure adhesive is not disposed between a second portion of the sidewall between the pair of the plurality of crush points and the first end of each of the plurality of battery cells. The light-cure adhesive is at least partially cured by exposing the first side of the carrier layer to light, before being fully cured by exposing the second side of the carrier layer to light. The current collector assembly is coupled to the second side of the carrier layer, and a rim terminal of each of the plurality of battery cells is electrically coupled to the current collector assembly through the opening.

In some embodiments of the present disclosure, a center button terminal of each of the plurality of battery cells may be electrically coupled to the current collector assembly through the opening or an additional opening in the bottom portion of the respective recess of the plurality of recesses.

In some embodiments of the present disclosure, the light-cure adhesive may be a UV-cure adhesive and the carrier layer may include a plastic configured to allow passage of UV light through the carrier layer to fully cure the UV-cure adhesive when exposing the second side of the carrier layer to the UV light.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DESCRIPTION

In view of the foregoing, and in accordance with some embodiments of the present disclosure, it would be advantageous to provide and easily manufacture a battery module having only one carrier layer on one end of the packaged battery cells, without requiring complicated machinery to hold the battery cells in place during assembly. To do this, the battery module assembly method described herein may apply an ultraviolet light-cure adhesive to recesses on a first side of a carrier layer, insert a plurality of battery cells into recesses while the carrier layer is in a first orientation, and partially cure the light-cure adhesive by exposing the first side of the carrier layer to light while the carrier layer is still in the first orientation. By partially curing the light-cure adhesive before the carrier layer is moved from the first orientation, the position of each of the battery cells in the carrier layer may be maintained throughout the assembly process without, for example, the complicated machinery described above.

Figure 1:
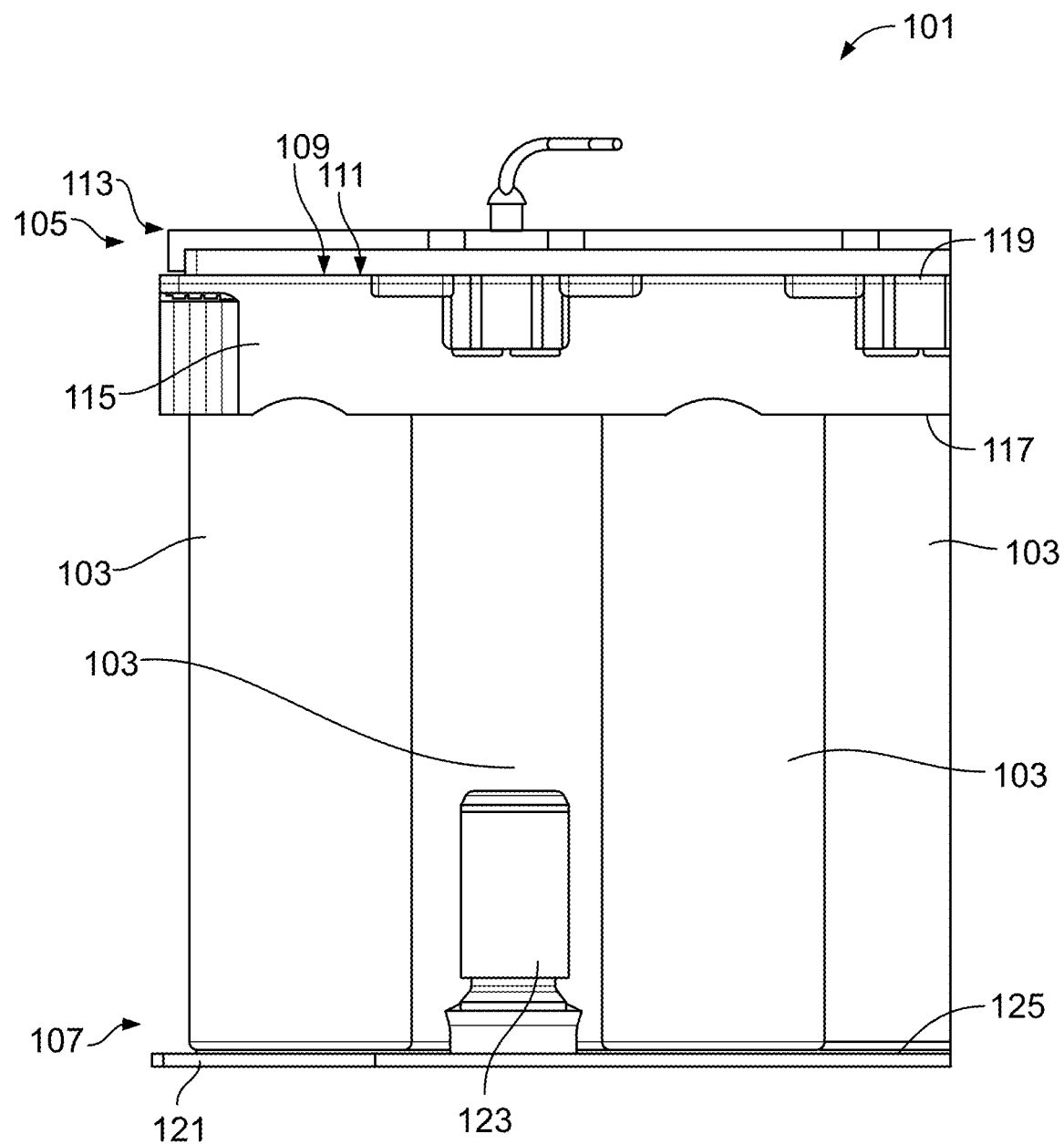
FIG. 1 shows a partial view of a battery module, in accordance with some embodiments of the present disclosure.

FIG. 1 shows a partial view of a battery module 101, in accordance with some embodiments of the present disclosure. As shown, the battery module 101 includes a plurality of battery cells 103. Each of the plurality of battery cells 103 may be cylindrical and may have a first end 105 and a second end 107, and a first electric terminal 109 (e.g., a center button terminal) and a second electrical terminal 111. In some embodiments of the present disclosure, each of the plurality of battery cells 103 may have an exposed region of electrically-active casing or a conductive jacket that covers at least a portion of the second end 107 and a side of each battery cell 103, forming the second electrical terminal 111 (e.g., a rim terminal). As shown, the battery module 101 also includes a current collector assembly 113. The current collector assembly 113 may include at least one busbar.

As shown, the battery module 101 includes a carrier layer 115 having a first side 117 and a second side 119. The first side 117 may be adjacent to the plurality of battery cells 103 and may have a plurality of recesses that are each configured to receive the first end 105 of the plurality of battery cells 103. The second side 119 may be adjacent to the current collector assembly 113. In some embodiments of the present disclosure, the carrier layer 115 may be a clear plastic, such as clear polycarbonate, clear acrylic, clear PET (polyethylene terephthalate), or any other appropriate translucent material. A clear plastic carrier layer may be used to enable the usage of a light-cure adhesive that can be exposed to light through the clear plastic carrier layer. For example, as described in greater detail with reference to FIGS. 3A and 3B, the plurality of battery cells 103 may be coupled to the plurality of recesses in the carrier layer 115 with the light-cure adhesive (or another coupling element). Light-cure adhesives may be advantageous due to their long tack-free times and selectively rapid cure times. In some embodiments, the light-cure adhesive may be a UV-light cure adhesive. In some embodiments, other types of light-cure adhesives may be used. For convenience in description, a UV-cure adhesive is described below.

The battery module 101 may further include a thermal transfer plate, e.g., a cooling plate 121, as shown. In some embodiments of the present disclosure, the thermal transfer plate may be used to selectively heat or cool the battery module 101. The cooling plate 121 may have two cooling fluid ports. Only one cooling fluid port 123 is shown in FIG. 1, where the cooling plate 121 either receives or outputs cooling fluid. In some embodiments of the present disclosure, there may be a thermal interface material 125 that thermally and structurally couples the second end 107 of each of the plurality of battery cells 103 to the cooling plate 121, maintaining the spatial positioning of the second ends 107 of the plurality of battery cells 103 on the cooling plate 121 during operation of the battery module 101, e.g., without the use of a separate carrier layer at the second ends 107 of the plurality of battery cells 103. In some embodiments of the present disclosure, the thermal interface material 125 may be an adhesive. It may be advantageous to minimize the thickness of the thermal interface material 125 for space-saving purposes. It may also be advantageous to minimize the thickness of the thermal interface material 125 to increase the cooling effect from the cooling plate 121 on the ends 107 of the plurality of battery cells 103. However, the thermal interface material 125 should be thick enough to account for worst-case tolerance stack-up, high voltage isolation requirements, and electrical or thermal insulation requirements of the battery module 101.

In some embodiments of the present disclosure, the components described above in relation to FIG. 1 may form a first battery submodule that may be combined with a second battery submodule similar to the first battery submodule. For example, the first and second battery submodules may be formed on opposite sides of the cooling plate 121.

Figure 2:
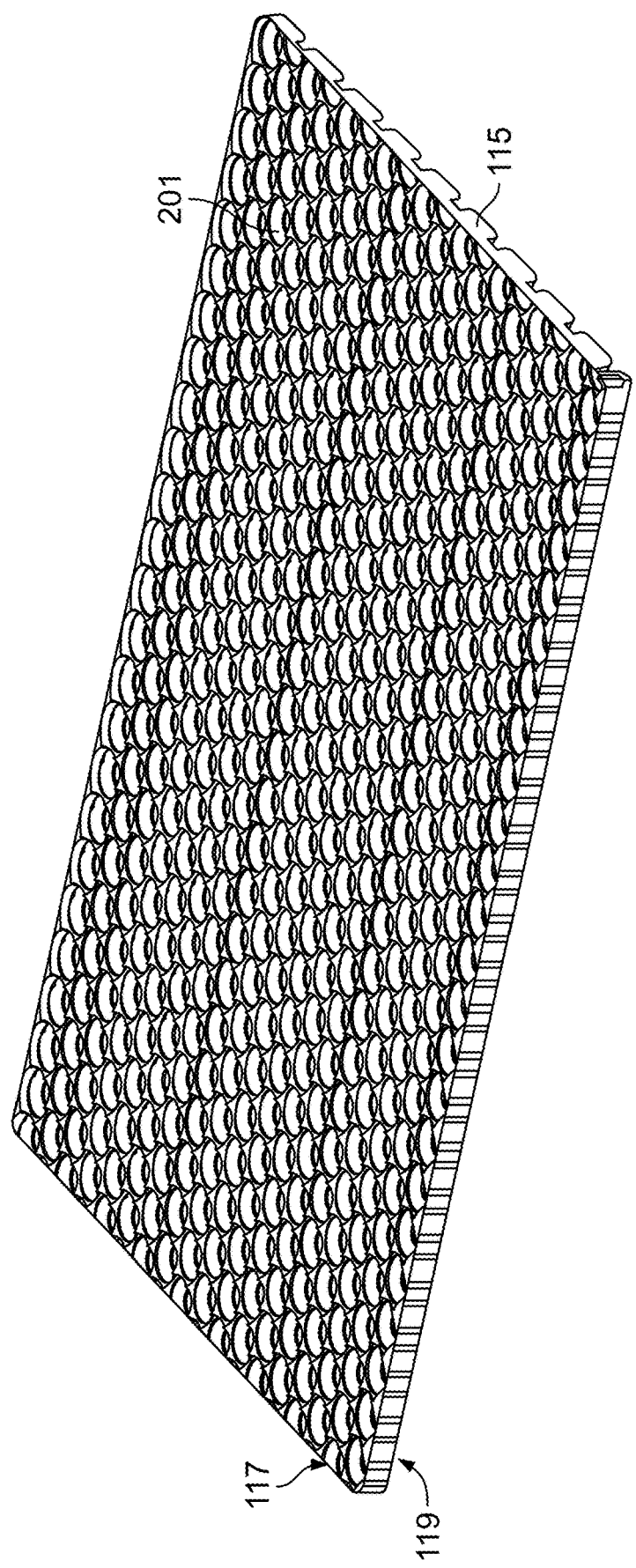
FIG. 2 shows a carrier layer in a first orientation, where a first side of the carrier layer has a plurality of recesses that are each configured to receive an end of a cylindrical battery cell, in accordance with some embodiments of the present disclosure.

FIGS. 2-10 show a series of steps in a process for assembling a battery module such as battery module 101 of FIG. 1, in accordance with some embodiments of the present disclosure. Each of the battery module components used in assembling the battery module 101 and described in the present disclosure may be provided by manufacturing or assembling the component itself, or obtaining the component from a supply of components. FIG. 2 shows the carrier layer 115 in a first orientation, where the first side 117 has a plurality of recesses 201 that are each configured to receive an end of a cylindrical battery cell, in accordance with some embodiments of the present disclosure. In some embodiments of the present disclosure, the plurality of recesses 201 may be arranged in a close hexagonal packing configuration. In some embodiments of the present disclosure, the first orientation refers to an orientation where the second side 119 is being supported by an assembly surface (e.g., an assembly pallet on a battery module assembly line). That is, in some embodiments of the present disclosure, the first orientation may refer to an orientation when the first side 117 faces substantially upwards (e.g., with respect to gravity).

Figure 3A:
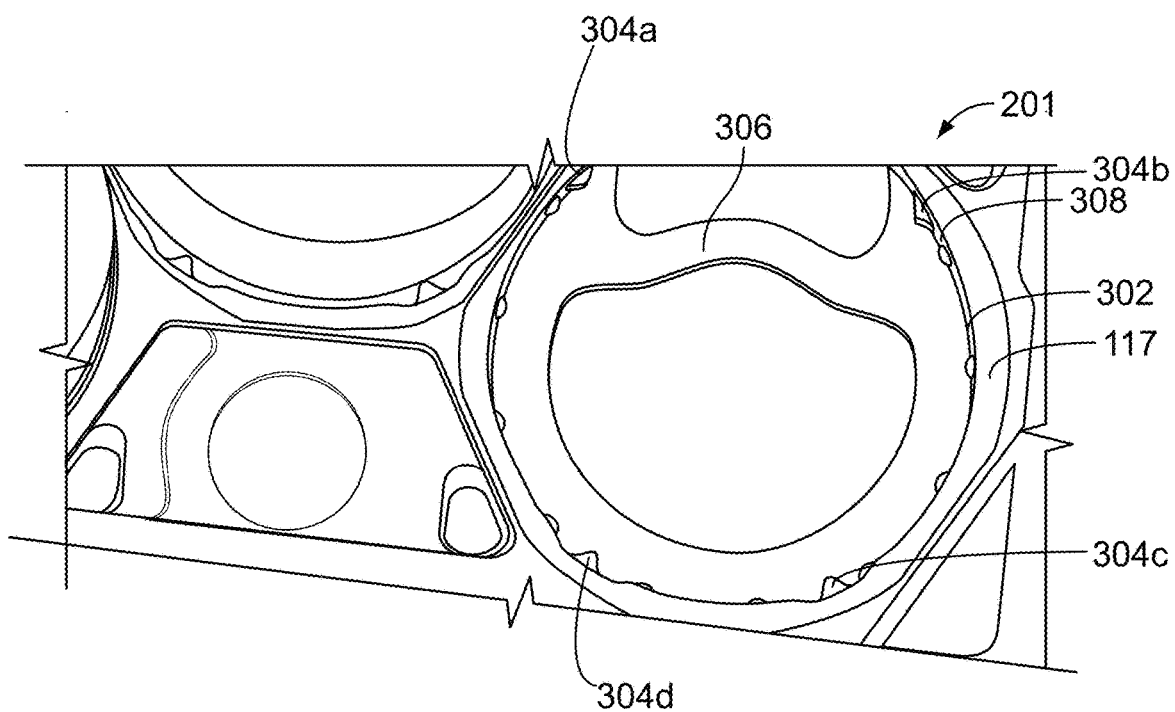
FIGS. 3A and 3B respectively show a partial top view and a partial perspective view of one of the plurality of recesses of the carrier layer before a corresponding one of a plurality of battery cells is inserted, in accordance with some embodiments of the present disclosure.
Figure 3B:
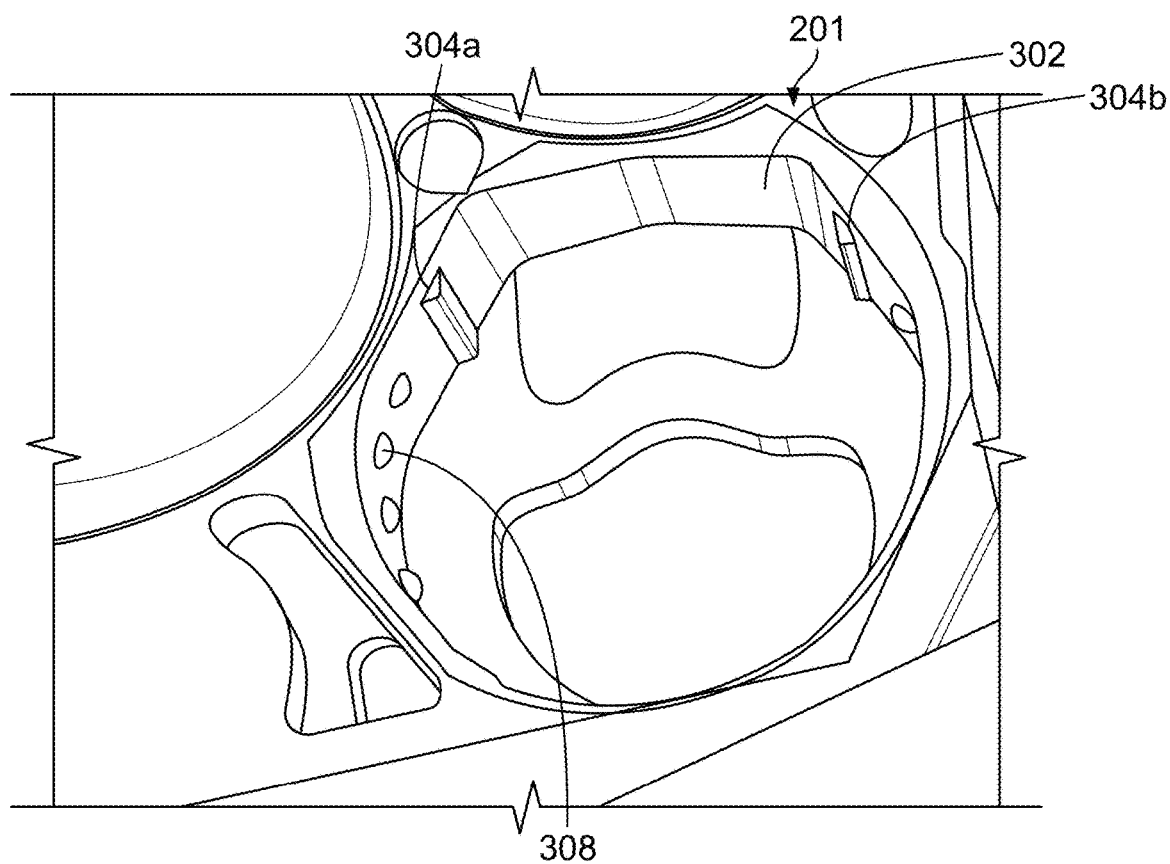

FIGS. 3A and 3B respectively show a partial top view and a partial perspective view of one of the plurality of recesses 201 of the carrier layer 115 before a corresponding one of the plurality of battery cells 103 is inserted, in accordance with some embodiments of the present disclosure. As shown, the recess 201 may have a cylindrical shape corresponding to the shape of the ends of the plurality of battery cells 103. The recess 201 may include a sidewall 302 having crush points 304 (304a, 304b, 304c, and 304d) spaced apart from each other along the sidewall 302, as well as a bottom portion 306. As shown, the crush points 304 are ridges that protrude from the sidewall 302 and extend upwards from the bottom portion 306. In some embodiments of the present disclosure, the crush points 304 may extend at least halfway up the sidewall 302. In some embodiments of the present disclosure, the crush points 304 may extend to a lip of each of the recesses 201. As shown, the bottom portion 306 includes spaces so that the terminals (109 and 111) of the plurality of battery cells 103 may be connected to the current collector assembly 113. Although four crush points 304 are shown, each recess 201 may include any number of crush points (e.g., less or more than four). In some embodiments of the present disclosure, the crush points 304 may be omitted, depending on the specific requirements of a particular battery module.

When a respective one of the plurality of battery cells 103 is pressed into the recess 201, the crush points 304 deform so that the battery cell 103 is held at least partially in the recess 201 by interference fit. In some embodiments of the present disclosure, however, the interference fit is not sufficient to maintain the battery cell 103 in the desired position during the remainder of the assembly process, let alone during operation (e.g., in an electric vehicle). For example, as shown in greater detail in FIG. 5, the plurality of battery cells 103 may be spaced only 1.25 millimeters from each other. Accordingly, a UV-cure adhesive 308 may be applied along the sidewall 302 before the battery cell 103 is pressed into the recess 201. For example, dollops of the UV-cure adhesive 308 may be spaced apart along the sidewall 302 between crush points 304a and 304d, between crush points 304d and 304c, and between crush points 304c and 304b. In some embodiments of the present disclosure, no adhesive of the UV-cure adhesive 308 is applied to the sidewall 302 between crush points 304a and 304b. In some embodiments of the present disclosure, thirteen dollops of the UV-cure adhesive 308 may be applied to the sidewall 302. However, this is only one example, and the UV-cure adhesive 308 may be applied in any pattern to the sidewall 302 (e.g., a continuous line between select crush points 304). In some embodiments of the present disclosure, the UV-cure adhesive 308 may be applied to a select portion of the ends, e.g., the first ends 105, of the plurality of battery cells 103 before they are pressed into the recesses 201 of the carrier layer 115 (e.g., instead of or in addition to the UV-cure adhesive 308 being applied to recess 201). For example, the UV-cure adhesive 308 may be applied to the first ends 105 of the plurality of battery cells 103 except the portion corresponding the portion between crush points 304a and 304b when each of the plurality of battery cells 103 are pressed into the recesses 201 of the carrier layer 115.

It is advantageous to apply the UV-cure adhesive 308 such that excess adhesive does not coat portions of the top of each of the plurality of battery cells 103 where electrical connections are made to each of the plurality of battery cells 103 (i.e., the ends of the battery cells 103 inserted into the recesses 201) when the battery cells 103 are pressed into their respective recesses 201. For example, in some embodiments of the present disclosure, as described above, because no adhesive of the UV-cure adhesive 308 is applied between the crush points 304a and 304b (or the corresponding portion of the first ends 105 of the plurality of battery cells 103), and because the crush points 304a and 304b prevent the UV-cure adhesive 308 from flowing into the area of the recess 201 between the crush points 304a and 304b, excess adhesive does not coat the portion of the top of the plurality of battery cells 103 exposed through the opening in the bottom portion 306 between the crush points 304a and 304b, thereby enabling a clean electrical connection to be made to this portion of each of the plurality of battery cells 103. In some embodiments of the present disclosure, some excess adhesive of the UV-cure adhesive 308 may be squeezed from between the sidewall 302 and each of the plurality of battery cells 103 to coat a portion of the top of each of the plurality of battery cells 103 and the bottom portion 306 between crush points 304a and 304d, between crush points 304d and 304c, and between 304c and 304b, and may improve the bond between each of the plurality of battery cells 103 and the corresponding recess 201. However, by carefully controlling the amount of the UV-cure adhesive 308 that is applied, it can be ensured no excess adhesive of the UV-cure adhesive 308 will be squeezed from between the sidewall 302 and each of the plurality of battery cells 103 to coat the portion of the top of each of the plurality of battery cells 103 exposed through the center hole in the bottom portion 306 where an electrical connection is made to each of the plurality of battery cells.

Figure 4:
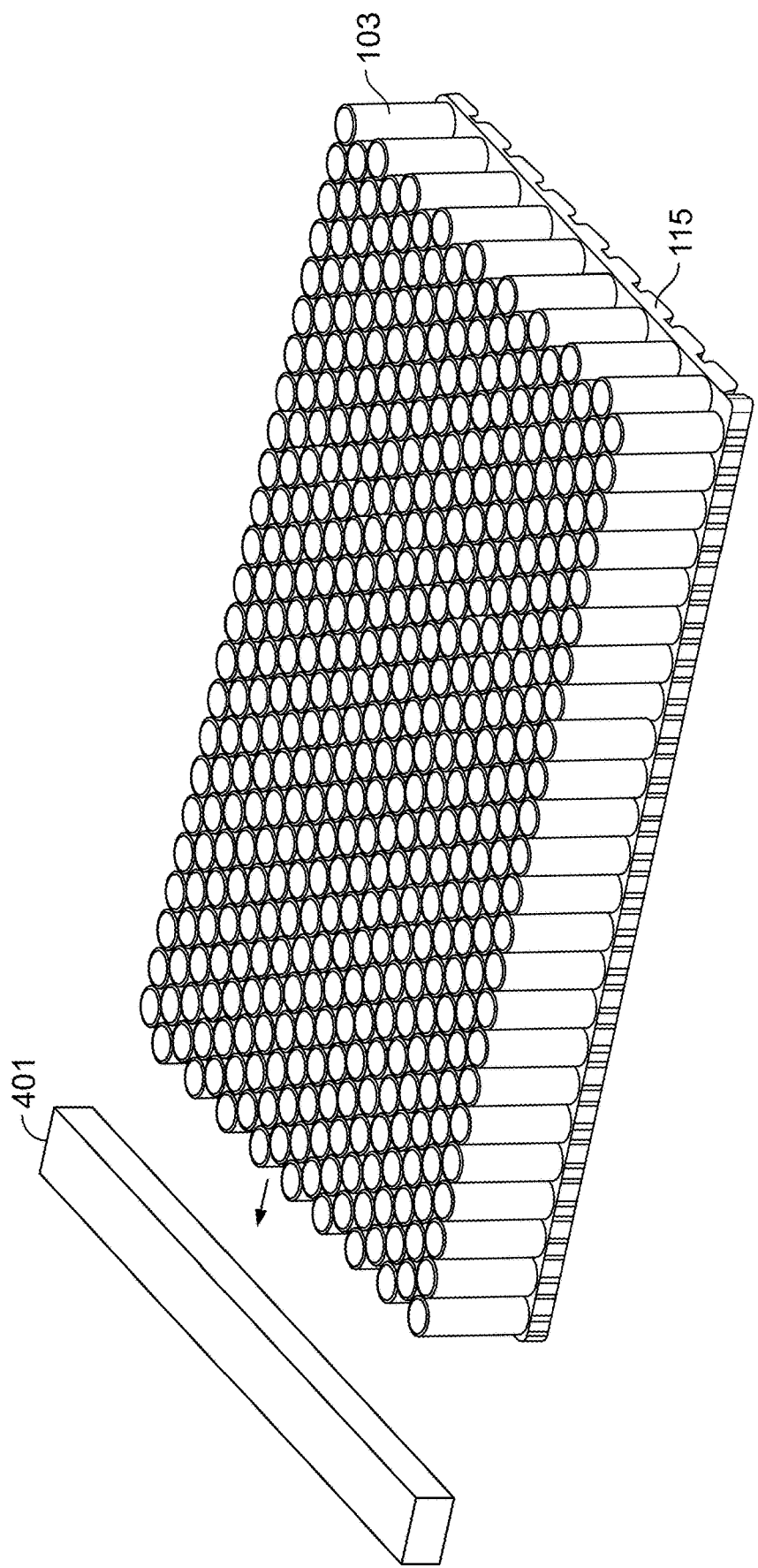
FIG. 4 shows the battery module assembly of FIG. 2 following the insertion of the plurality of battery cells into the plurality of recesses of the carrier layer, in accordance with some embodiments of the present disclosure.
Figure 8:
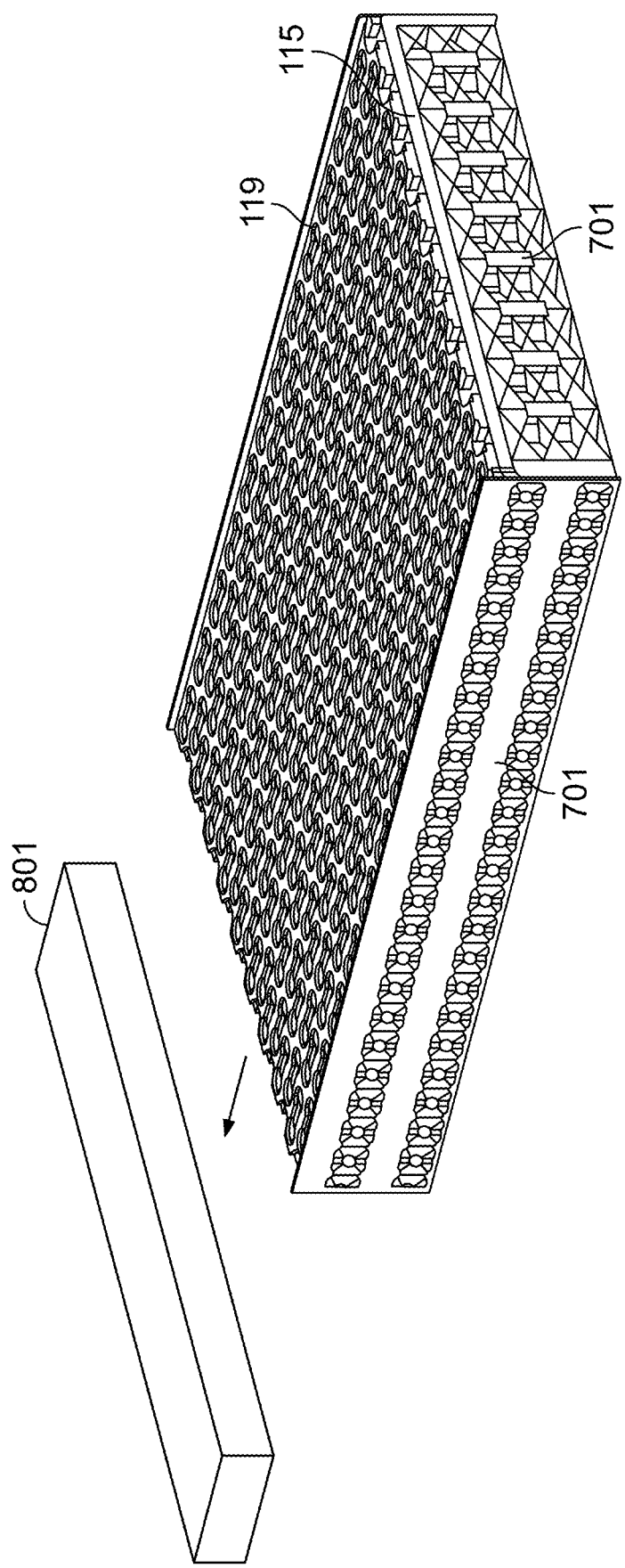
FIG. 8 shows the battery module assembly of FIG. 7 after it has been moved from the first orientation to a second orientation, in accordance with some embodiments of the present disclosure.

FIG. 4 shows the battery module assembly of FIG. 2 following the insertion of the plurality of battery cells 103 into the plurality of recesses 201 of the carrier layer 115, in accordance with some embodiments of the present disclosure. As described above, the UV-cure adhesive 308 may be applied to the recesses 201 of the carrier layer 115 (and/or the first ends of the plurality of battery cells 103) before the plurality of battery cells 103 are pressed into the recesses 201 of the carrier layer 115. Following the insertion of the plurality of battery cells 103, it may be necessary to cure the UV-cure adhesive 308 to maintain the positions of the plurality of battery cells 103 during assembly and during operation of the battery module. To fully cure the UV-cure adhesive 308, it may be necessary to move the battery module assembly from the first orientation (FIG. 2) to a second orientation (e.g., upside-down relative to the first orientation as shown in FIG. 8) so that the UV-cure adhesive 308 may be exposed to UV light passing through the second side 119 of the carrier layer 115, which may be a clear plastic carrier layer.

Moving the battery module assembly from the first orientation to the second orientation (or performing other assembly steps), however, may cause the position of some of the plurality of battery cells 103 to shift. Thus, in some embodiments of the present disclosure, in order to maintain the positions of the plurality of battery cells 103 while the battery module assembly is moved from the first orientation to the second orientation (or while performing other assembly steps), the first side 117 of the carrier layer 115 is exposed to UV light (e.g., from UV light 401) while the battery module assembly is still in the first orientation so as to partially cure the UV-cure adhesive 308. For example, as shown, the battery module assembly may be passed under the UV light 401 so that the portion of the UV-cure adhesive 308 exposed to the UV light is cured (partial curing of the UV-cure adhesive 308 is more clearly shown in FIG. 5). As another example, the UV light 401 may be passed over the battery module assembly. Also, while UV light 401 is shown as a light bar, in some embodiments the UV light 401 may be a spot light source, which is passed over the battery module multiple times at different positions to apply UV light to the entire first side 117 of the carrier layer 115. Once the UV-cure adhesive 308 is partially cured, the partially cured UV-cure adhesive 308 secures the positions of the plurality of battery cells 103 within the carrier layer 115.

Figure 5:
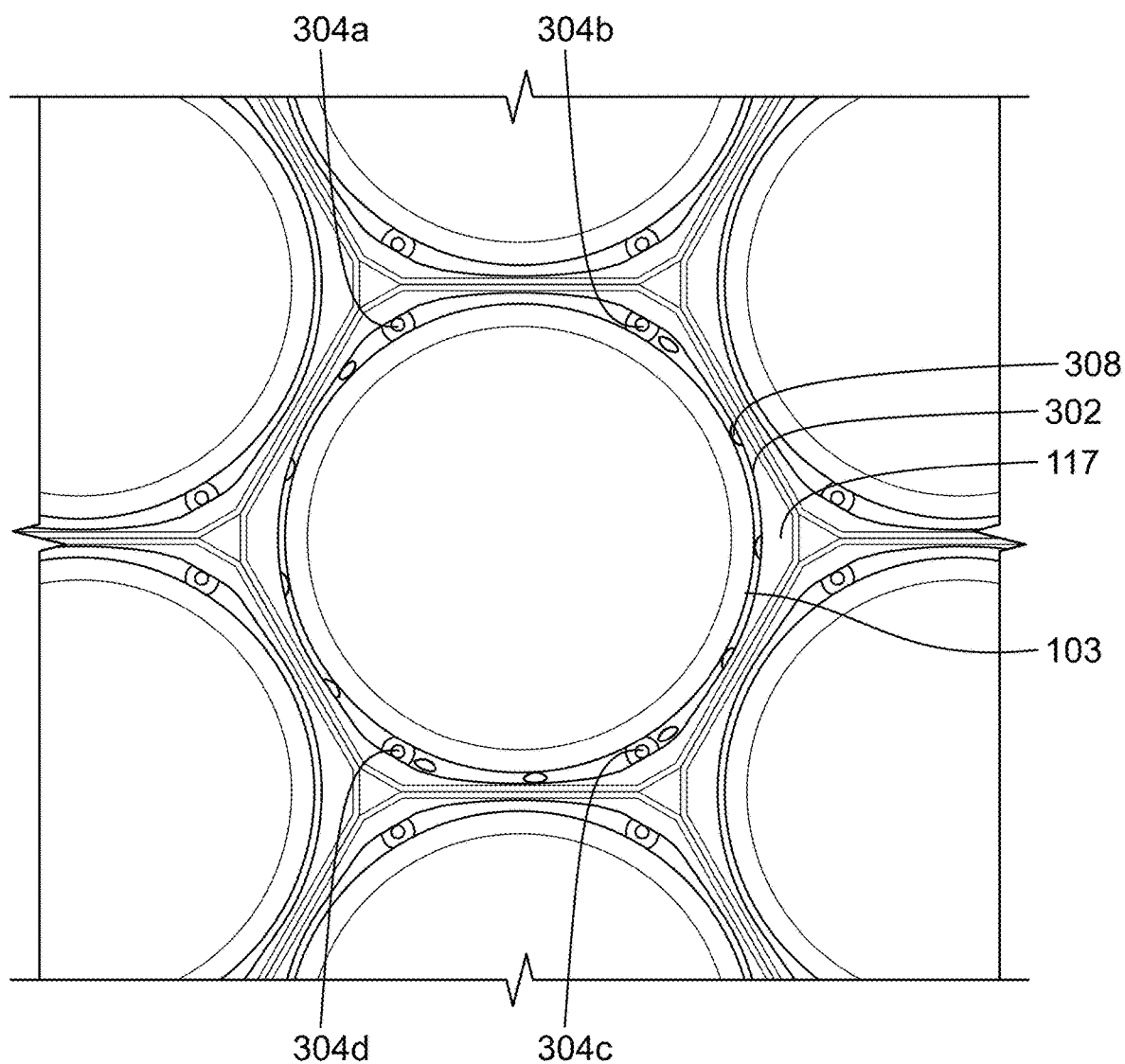
FIG. 5 shows a partial top view of the battery module assembly of FIG. 4, in accordance with some embodiments of the present disclosure.

FIG. 5 shows a partial top view of the battery module assembly of FIG. 4, in accordance with some embodiments of the present disclosure. As shown, because the crush points 304 space the battery cell 103 a certain distance from the sidewall 302 of the recess 201, UV light applied to the first side 117 of the carrier layer 115 (e.g., when the battery module assembly is in the first orientation) may be incident to a portion of the UV-cure adhesive 308, thereby partially curing the UV-cure adhesive 308. As shown, the UV-cure adhesive 308 is not applied between the sidewall 302 and the battery cell 103 between the crush point 304a and 304b. Although applying UV light to the first side of the carrier layer 115 may not fully cure the UV-cure adhesive 308, partially curing the UV-cure adhesive 308 may be sufficient to maintain the position of each of the plurality of battery cells 103 within the carrier layer 115 while the battery module assembly is moved from the first orientation to the second orientation or while performing other assembly steps, as described below. In some embodiments of the present disclosure, the projection height of each of the crush points 304 and the amount of UV-cure adhesive 308 applied to each of the recesses 201 (or battery cells 103) may be optimized for the particular battery module 101.

Figure 6:
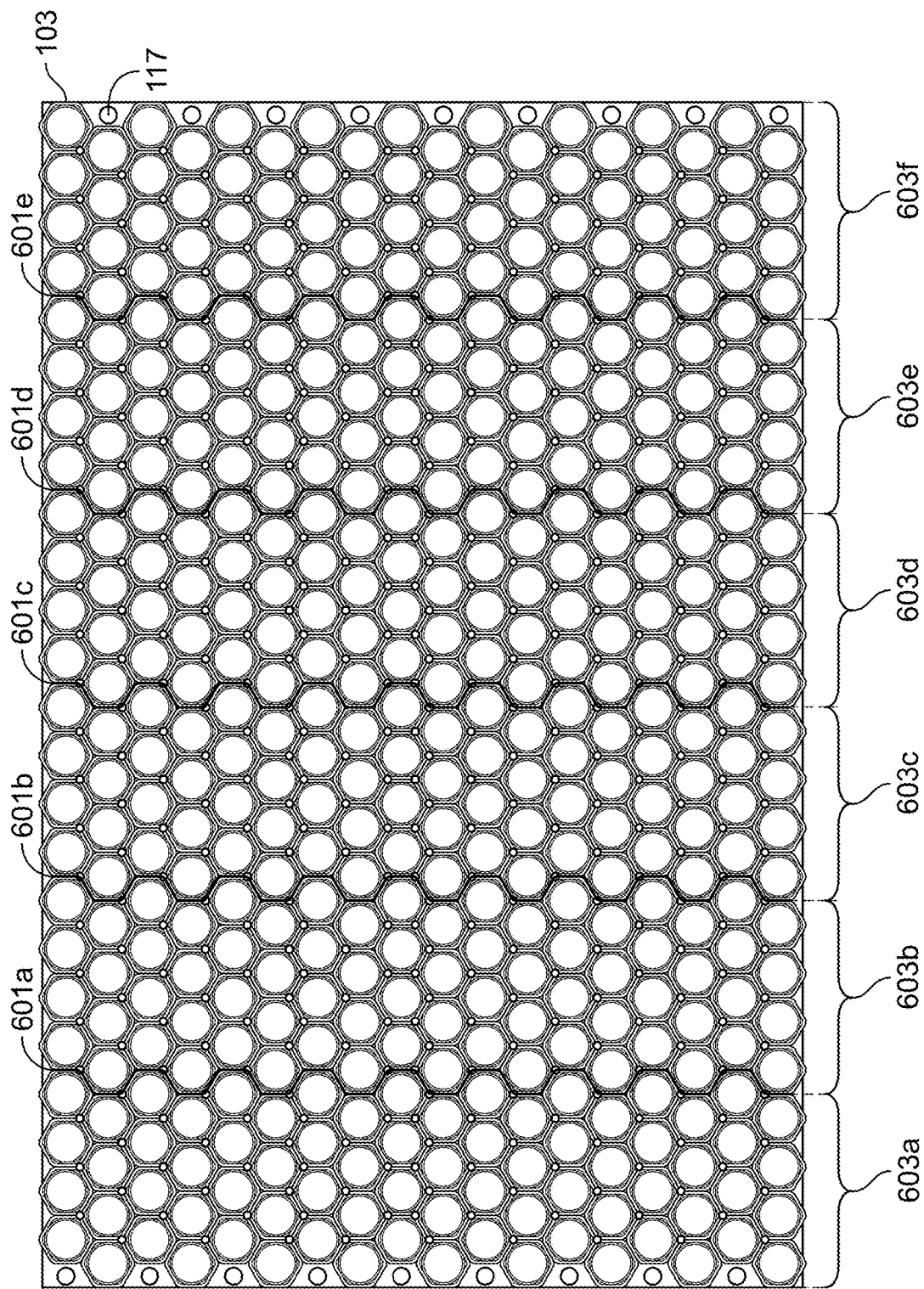
FIG. 6 shows the battery module assembly of FIG. 4 following the insertion of a plurality of barrier layers between groups of the plurality of battery cells, in accordance with some embodiments of the present disclosure.

FIG. 6 shows the battery module assembly of FIG. 4 following the insertion of a plurality of barrier layers 601 between groups of the plurality of battery cells 103, in accordance with some embodiments of the present disclosure. In some embodiments of the present disclosure, the barrier layers 601 (e.g., 601a, 601b, 601c, 601d, and 601e) may be inserted between groups of the plurality of battery cells 103 at different operating voltages (e.g., parallel groups 603a, 603b, 603c, 603d, 603e, and 603f of the plurality of battery cells 103) to provide electrical insulation in the event that the position of any of the plurality of battery cells 103 shifts (e.g., due to vibration or an impact to the battery module 101). In some embodiments of the present disclosure, the barrier layers 601 may comprise a fire-resistant material to prevent a fire from spreading between groups of the plurality of battery cells 103. Although five barrier layers 601 are shown, any number of barrier layers may be used. In some embodiments of the present disclosure, the barrier layers 601 may be optional, depending on the specific requirements of a particular battery module.

Figure 7:
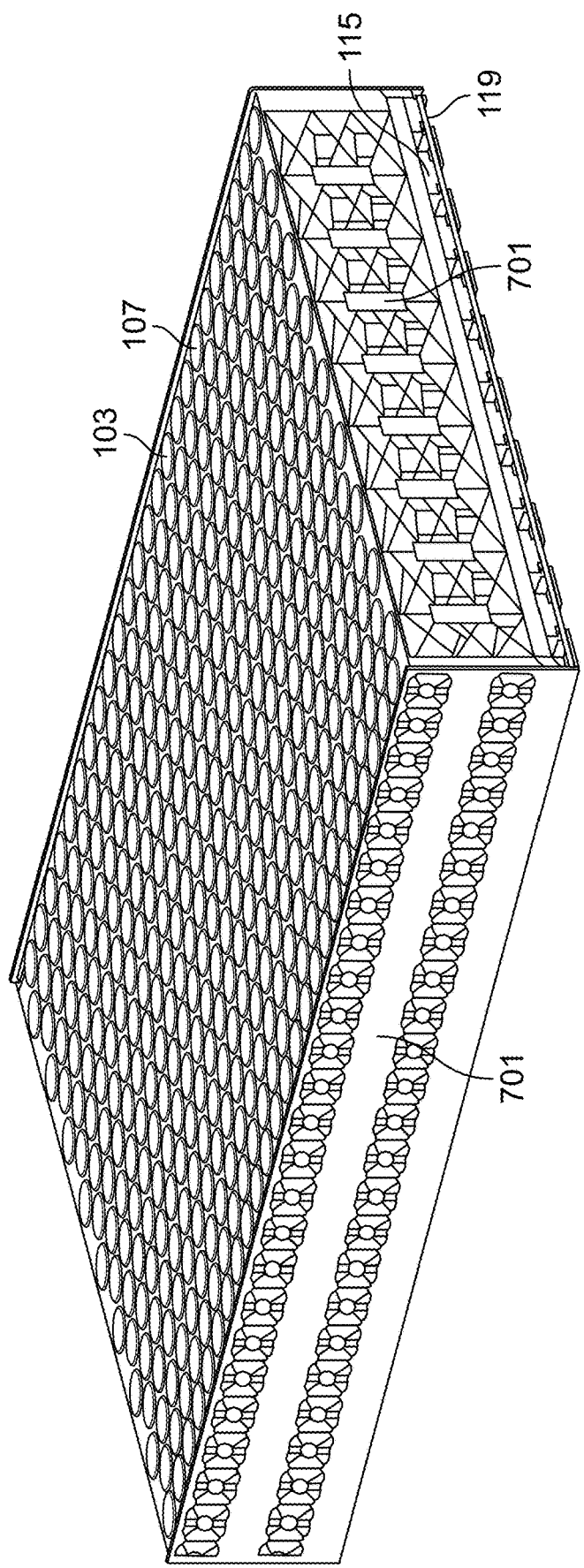
FIG. 7 shows the battery module assembly of FIG. 6 or FIG. 4 following the addition of sidewalls, in accordance with some embodiments of the present disclosure.

FIG. 7 shows the battery module assembly of FIG. 6 (or FIG. 4) following the addition of sidewalls 701, in accordance with some embodiments of the present disclosure. As shown, the addition of the sidewalls 701 results in the plurality of battery cells 103 being encased on at least five sides (i.e., by the carrier layer 115 on one side, and by the sidewalls 701 on four sides). As shown, the second ends 107 of the plurality of battery cells 103 may remain exposed. In some embodiments of the present disclosure, the sidewalls 701 may be a translucent material, e.g., a clear plastic material or a material translucent to UV light (or to the wavelength of light used to cure the light-cure adhesive). In some embodiments of the present disclosure, the sidewalls 701 may comprise the same material as the carrier layer 115. In some embodiments of the present disclosure, the sidewalls 701 are attached to the battery module assembly by an adhesive (e.g., a UV-cure adhesive or other quick cure adhesives or a combination of quick cure adhesive and high strength adhesive).

FIG. 8 shows the battery module assembly of FIG. 7 after it has been moved from the first orientation (FIGS. 2-7) to a second orientation, as shown, in accordance with some embodiments of the present disclosure. In some embodiments of the present disclosure, as described above, in the second orientation, the carrier layer 115 may be upside-down relative to the position of the carrier layer 115 in the first orientation. After the battery module assembly is moved to the second orientation, the uncured portion of the UV-cure adhesive 308 is exposed to UV light (e.g., from UV light 801) passing through the second side 119 of the carrier layer 115 to fully cure the UV-cure adhesive 308. For example, the battery module assembly in the second orientation may be passed under the UV light 801. In some embodiments, UV light 801 may be the same as or similar to UV light 401 described above.

Figure 9:
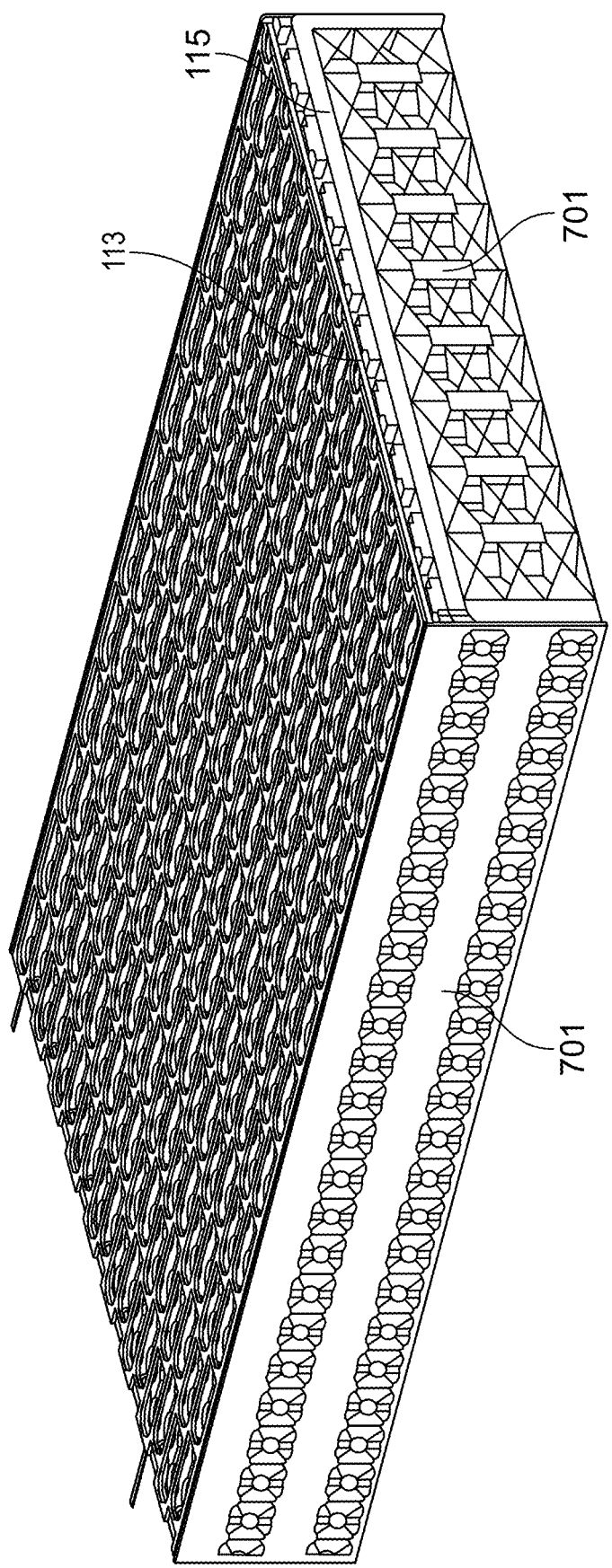
FIG. 9 shows the battery module assembly of FIG. 8 following the installation of a current collector assembly, in accordance with some embodiments of the present disclosure.

FIG. 9 shows the battery module assembly of FIG. 8 following the installation of a current collector assembly 113, in accordance with some embodiments of the present disclosure. In some embodiments of the present disclosure, the current collector assembly 113 may include the conductive busbars. The current collector assembly 113 may be installed by physically coupling portions of the current collector assembly 113 with the carrier layer 115 and electrically coupling portions of each busbar in the current collector assembly 113 to a group of the plurality of battery cells 103 in the battery module assembly. In some embodiments of the present disclosure, an adhesive may be applied to the current collector assembly 113 (or the carrier layer 115) before it is installed. In some embodiments of the present disclosure, installing the current collector assembly 113 may involve welding the current collector assembly 113 to at least some of the plurality of battery cells 103. Following the installation of the current collector assembly 113, the battery module assembly of FIG. 9 may be moved from its current orientation (i.e., the second orientation shown in FIGS. 8-9) to a different orientation (e.g., back to the first orientation as shown in FIGS. 2-7). In some embodiments of the present disclosure, this may involve "flipping" the battery module assembly upside-down.

Figure 10:
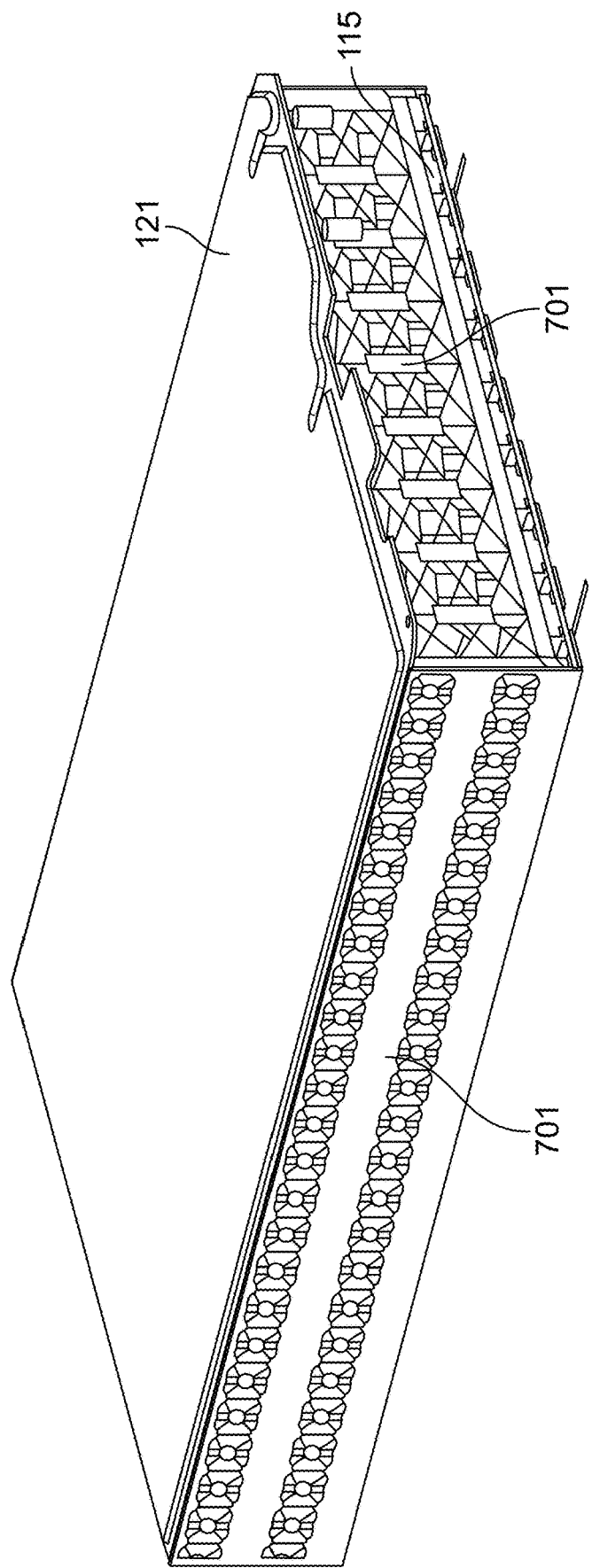
FIG. 10 shows the battery module assembly of FIG. 9 following the installation of a cooling plate, in accordance with some embodiments of the present disclosure.

FIG. 10 shows the battery module assembly of FIG. 9 following the installation of a cooling plate 121, in accordance with some embodiments of the present disclosure. In some embodiments of the present disclosure, the cooling plate 121 may be coupled to the exposed ends 107 of the plurality of battery cells 103 after the thermal interface material 125 has been applied and after the battery module assembly of FIG. 9 is moved back to the first orientation. In some embodiments of the present disclosure, the battery module assembly of FIG. 9 may be lifted and placed on the cooling plate 121 while still in the second orientation.

Figure 11:
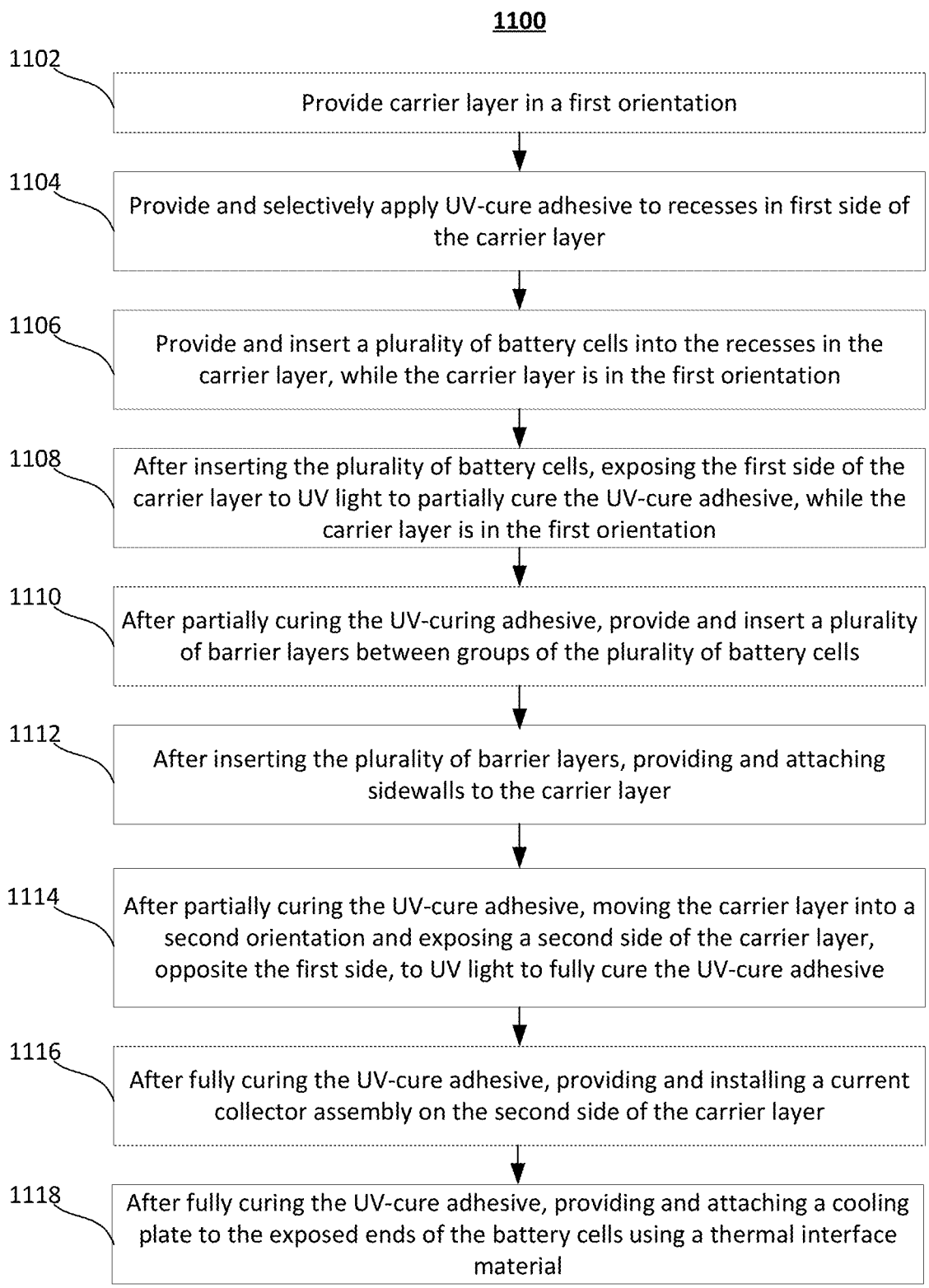
FIG. 11 shows a flowchart of an illustrative process for manufacturing a battery module, in accordance with some embodiments of the present disclosure.

FIG. 11 shows a flowchart of an illustrative process 1100 for manufacturing a battery module 101, in accordance with some embodiments of the present disclosure.

At step 1102, a carrier layer is provided in a first orientation. The carrier layer may be the carrier layer 115 in the first orientation, as described above in FIG. 2.

At step 1104, a UV-cure adhesive is provided and selectively applied to recesses in a first side of the carrier layer. The UV-cure adhesive may be the UV-cure adhesive 308 applied to the recesses 201 in the first side 117 of the carrier layer 115, as described above in FIGS. 3A and 3B.

At step 1106, a plurality of battery cells is provided and inserted into the recesses in the carrier layer, while the carrier layer is in the first orientation. The plurality of battery cells may be the plurality of battery cells 103 inserted into the recesses 201 in the carrier layer 115, while the carrier layer is in the first orientation, as described above in FIG. 4.

At step 1108, after inserting the plurality of battery cells, the first side of the carrier layer is exposed to UV light to partially cure the UV-cure adhesive, while the carrier layer is in the first orientation. The UV light may be incident to the first side 117 of the carrier layer 115 from the UV light 401, as described above in FIGS. 4 and 5.

At step 1110, after partially curing the UV-cure adhesive, a plurality of barrier layers is provided and inserted between groups of the plurality of battery cells. The plurality of barrier layers may be the plurality of barrier layers (601a, 601b, 601c, 601d, 601e) respectively inserted between groups (603a, 603b, 603c, 603d, 603e, and 603f) of the plurality of battery cells 103, as described above in FIG. 6.

At step 1112, after inserting the plurality of barrier layers, sidewalls are provided and attached to the carrier layer. The sidewalls may be the sidewalls 701 attached to the sides of the carrier layer 115, as described above in FIG. 7.

At step 1114, after partially curing the UV-cure adhesive, the carrier layer is moved into a second orientation and a second side of the carrier layer, opposite to the first side, is exposed to UV light to fully cure the UV-cure adhesive. The second side of the carrier layer may be the second side 119 of the carrier layer 115, and the UV light may be incident to the second side 119 (e.g., from the UV light 801), while the carrier layer 115 is in the second orientation, as described above in FIG. 8.

At step 1116, after fully curing the UV-cure adhesive, a current collector assembly is provided and installed on the second side of the carrier layer. The current collector assembly may be the current collector assembly 113 installed on the second side 119 of the carrier layer 115, as described above in FIG. 9.

At step 1118, after fully curing the UV-cure adhesive, a cooling plate is provided and attached to exposed ends of the plurality of battery cells using a thermal interface material. The cooling plate may be the cooling plate 121 and may be attached to the second ends 107 of the plurality of battery cells 103 using the thermal interface material 125, as described above in FIG. 10

It will be understood that while process 1100 was described in the context of manufacturing a battery module, process 1100 may be used for manufacturing any module that requires a reorientation before a UV-cure adhesive can be fully cured to secure components in a carrier. It will also be understood that some of the steps of process 1100 may be omitted or performed in a different order than as described above in FIG. 11. For example, in some embodiments of the present disclosure, step 1110 may be omitted, step 1114 may be performed after step 1108 (e.g., before steps 1110 and 1112), and step 1118 may be performed after step 1114 (e.g., before step 1116).

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method of assembling a battery module, the method comprising:
   selectively applying a light-cure adhesive to each of a plurality of recesses in a carrier layer, wherein the carrier layer comprises a first side and a second side opposite the first side, the first side comprising a plurality of recesses;

inserting each of a plurality of battery cells into a respective recess of the plurality of recesses with the carrier layer in a first orientation, wherein a first end of each of the plurality of battery cells thereby makes contact with a light-cure adhesive in its respective recess;

exposing the first side of the carrier layer, after inserting each of the plurality of battery cells, to light to at least partially cure the light-cure adhesive with the carrier layer in the first orientation;

moving the carrier layer, after exposing the first side of the carrier layer to light, into a second orientation different than the first orientation; and exposing the second side of the carrier layer to light to fully cure the light-cure adhesive with the carrier layer in the second orientation.

2. The method of claim 1, wherein the selectively applying the light-cure adhesive to each of the plurality of recesses comprises selectively applying the light-cure adhesive to a sidewall of each of the plurality of recesses.

3. The method of claim 2, wherein selectively applying the light-cure adhesive to the sidewall of each of the plurality of recesses comprises selectively applying a plurality of dollops of light-cure adhesive along the sidewall of each of the plurality of recesses.

4. The method of claim 1, wherein selectively applying the light-cure adhesive to each of the plurality of recesses comprises selectively applying the light-cure adhesive to the first end of each of the plurality of battery cells before inserting each of the plurality of battery cells into a respective recess of the plurality of recesses.

5. The method of claim 1, wherein each of the plurality of recesses comprises a sidewall, the sidewall comprising a plurality of crush points spaced apart from each other along the sidewall and protruding from the sidewall such that the plurality of crush points is configured to at least partially hold a respective battery cell, of the plurality of battery cells, by interference fit by deforming when the battery cell is pressed into its respective recess, wherein each one of the plurality of crush points comprises a ridge protruding from the sidewall.

6. The method of claim 5, wherein the selectively applying the light-cure adhesive to each of the plurality of recesses comprises at least one of:

selectively applying the light-cure adhesive to portions of the sidewall between all but one of adjacent ones of the plurality of crush points before inserting each of the plurality of battery cells into a respective recess of the plurality of recesses; and selectively applying the light-cure adhesive to portions of the first end of each of the plurality of battery cells before inserting each of the plurality of battery cells into a respective recess of the plurality of recesses, each of the portions of the first end of each of the plurality of battery cells corresponding to portions of the sidewall between all but one of adjacent ones of the plurality of crush points.

7. The method of claim 1, further comprising attaching, after exposing the first side of the carrier layer to light, sidewalls to the battery module.

8. The method of claim 7, further comprising, inserting, after exposing the first side of the carrier layer to light and before attaching the sidewalls to the battery module, a barrier layer between a first group of battery cells and a second group of battery cells among the plurality of battery cells.

9. The method of claim 8, wherein the barrier layer electrically isolates electrically-active casings of the first group of battery cells from electrically-active casing of the second group of battery cells.

10. The method of claim 1, further comprising attaching, after exposing the second side of the carrier layer to light, a current collector assembly to the second side of the carrier layer and electrically coupling portions of the current collector assembly to the plurality of battery cells.

11. The method of claim 1, further comprising applying, after exposing the second side of the carrier layer to light, a thermal interface material to one of a cooling surface and a second end of each of the plurality of battery cells.

12. The method of claim 11, further comprising attaching the cooling surface to the second end of each of the plurality of battery cells using the thermal interface material.

13. The method of claim 1, wherein the plurality of battery cells is positioned in a close-hex-pack configuration in the carrier layer.

14. The method of claim 1, wherein the carrier layer comprises a plastic configured to allow passage of the light through the carrier layer to fully cure the light-cure adhesive when exposing the second side of the carrier layer to the light.

15. The method of claim 1, wherein the carrier layer in the first orientation is an orientation in which the first side of the carrier layer is facing up, with respect to gravity.

16. The method of claim 13, wherein the first orientation is opposite to the second orientation.

17. The method of claim 1, wherein:
the light-cure adhesive is a UV-cure adhesive, and
the light is a UV light.

18. A battery module comprising:
a plurality of battery cells;
a light-cure adhesive; and
a carrier layer comprising a first side and a second side opposite the first side, the first side comprising a plurality of recesses,
wherein:
each of the plurality of recesses comprises a sidewall and a bottom portion, the sidewall comprising a plurality of crush points spaced apart from each other along the sidewall and protruding from the sidewall, each of the plurality of crush points comprising a ridge protruding from the sidewall, and the bottom portion comprising an opening positioned between a pair of the plurality of crush points,
a first end of each of the plurality of battery cells is coupled to a respective recess of the plurality of recesses by the light-cure adhesive disposed between the first end of each of the plurality of battery cells and a first portion of the sidewall, wherein the light-cure adhesive is not disposed between a second portion of the sidewall between the pair of the plurality of crush points and the first end of each of the plurality of battery cells, and
the light-cure adhesive is at least partially cured by exposing the first side of the carrier layer to light, before being fully cured by exposing the second side of the carrier layer to light.

19. The battery module of claim 18, further comprising a current collector assembly,
wherein:
the current collector assembly is coupled to the second side of the carrier layer, and
a rim terminal of each of the plurality of battery cells is electrically coupled to the current collector assembly through the opening, and a center button terminal of each of the plurality of battery cells is electrically coupled to the current collector assembly through the opening or an additional opening in the bottom portion of the respective recess of the plurality of recesses.

20. The battery module of claim 18, wherein the light-cure adhesive is a UV-cure adhesive and the carrier layer comprises a plastic configured to allow passage of UV light through the carrier layer to fully cure the UV-cure adhesive when exposing the second side of the carrier layer to the UV light.

* * * * *